United States Patent
Wiley

(10) Patent No.: US 10,207,403 B1
(45) Date of Patent: Feb. 19, 2019

(54) ROBOTIC PLATFORM AND ASSEMBLY

(71) Applicant: Facebook, Inc., Menlo Park, CA (US)

(72) Inventor: Scott C. Wiley, Los Altos, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/828,414

(22) Filed: Nov. 30, 2017

(51) Int. Cl.
*B60K 17/30* (2006.01)
*B25J 9/16* (2006.01)
*B25J 5/00* (2006.01)
*B25J 9/00* (2006.01)
*B62D 55/065* (2006.01)

(52) U.S. Cl.
CPC .............. *B25J 9/162* (2013.01); *B25J 5/005* (2013.01); *B25J 5/007* (2013.01); *B25J 9/0084* (2013.01); *B25J 9/1602* (2013.01); *B25J 9/1682* (2013.01); *B62D 55/0655* (2013.01)

(58) Field of Classification Search
None
See application file for complete search history.

(56) References Cited

U.S. PATENT DOCUMENTS

| | | | | |
|---|---|---|---|---|
| 4,616,730 A | * | 10/1986 | Strehler | B62D 7/02 180/23 |
| 4,683,973 A | * | 8/1987 | Honjo | B62D 7/026 180/252 |
| 4,778,024 A | * | 10/1988 | Matsumoto | B62D 1/28 180/167 |
| 6,491,127 B1 | * | 12/2002 | Holmberg | B60K 7/0007 180/21 |
| 8,348,002 B2 | * | 1/2013 | Checketts | B60K 7/0007 180/200 |
| 2012/0066846 A1 | * | 3/2012 | Yu | B62D 57/024 15/1.7 |

* cited by examiner

*Primary Examiner* — Bentsu Ro
(74) *Attorney, Agent, or Firm* — FisherBroyles, LLP

(57) ABSTRACT

A robotic platform may include a chassis, a drive assembly, and a pair of fore and aft wheel assemblies. The drive assembly may include a motor and belt that is controlled by the motor. The wheel assemblies may each include a wheel mounted to an axle for rotation about a drive axis and steering about a steering axis, and a shaft. The shaft may extend along the steering axis from one end that is connected to the axle, to another end that is wrapped by the belt, such that the belt controls rotation of the shaft. Various other assemblies, robots, and methods are also disclosed.

20 Claims, 7 Drawing Sheets

ROBOTIC PLATFORM AND ASSEMBLY

BACKGROUND

Robots are used in a nearly unlimited number of applications, from mapping and exploring unknown terrain, to performing rescue missions in extreme environmental conditions, to performing surgeries in hospitals, to managing data centers, among a host of other scenarios. Robots are typically mounted to a robotic platform that may enable the robots to move along a floor or other surface. Caster wheels may be mounted to a robotic platform to enable rolling or otherwise linear movement of a robot in a generally horizontal direction. Some robotic platforms may have caster wheels that are powered or driven. For example, a power assembly (such as an electric motor) may control rotation of a caster wheel's axle, which may in turn control rotation of the wheel thereabout to move the robot. Some powered or driven caster wheels may also include brake assemblies designed to retard rotation of the wheel axle and thus slow or stop rotation of the wheel, thereby slowing or stopping the robot. Traditionally, at least a portion of this power assembly, as well as a corresponding brake assembly, may be disposed within the circumference of the wheel, near the wheel hub, and adjacent to the axle.

The placement of a power or brake assembly within the circumference of a caster wheel, however, can lead to various disadvantages. For example, when an electrical component of the power assembly (e.g., the motor) disposed within the circumference of the wheel, the motor may be exposed to whatever conditions the wheel moves through. This is particularly problematic for robots that are intended to move through treacherous conditions or water.

In addition, when all or some portion of the power assembly is located within the circumference of a wheel, the electrical wires that provide electricity to the power assembly may limit the maneuverability of the robotic platform since the wheel may be unable to rotate 360 degrees without entangling the wires. This is especially disadvantageous for robot platforms intended to be highly maneuverable.

Positioning all or some of the power assembly within the circumference of the wheel may also lead to an increased risk of damage to the power assembly. For instance if fragile parts of the power assembly are located near a wheel, these parts may be damaged during a drop or fall. Similar issues may arise when positioning brake assemblies within the circumference of a caster wheel.

As such, the instant disclosure identifies and addresses a need for improved caster wheels and robotic platforms.

SUMMARY

As will be described in greater detail below, the instant disclosure describes a driven (or powered) robotic platform. The robotic platform may be driven by a power assembly that drives caster wheel assemblies. The power assembly may include a drive belt that drives the caster wheel assemblies synchronously. The power assembly may drive each of the caster wheels by controlling rotation of a respective caster wheel substantially vertically extending drive shaft, which may be connected to the caster wheel axle via a bevel gear. Thus, the power assembly may be located entirely outside the circumference of the wheel.

In some embodiments, the robotic platform may include a chassis, a drive assembly arranged on the chassis, a pair of fore wheel assemblies disposed on a fore end of the chassis, and a pair of aft wheel assemblies disposed on an aft end of the chassis. The drive assembly may include a drive motor and a drive belt that is controlled by the drive motor. Each of the fore and aft wheel assemblies may include a caster wheel, a drive shaft, and a bevel gear. The caster wheel may be mounted to an axle for rotation about a drive axis and steering about a substantially vertical steering axis. The drive shaft may extend along the steering axis from a first drive shaft end to a second drive shaft end. The first drive shaft end may be connected to the wheel axle and the second drive shaft end may be wrapped by the drive belt such that the drive belt controls rotation of the drive shaft about the steering axis. The bevel gear may connect the first drive shaft end to the axle such that rotation of the drive shaft about the steering axis controls rotation of the wheel about the drive axis to drive the robotic platform in a substantially horizontal direction. Various other assemblies and methods are also disclosed.

In some embodiments, the drive belt may be wrapped around the drive shafts of the fore and aft wheel assemblies such that all the drive shafts rotate synchronously. The drive axis and the steering axis may together form an oblique angle, such that the wheel is tilted relative to the drive shaft. The second drive shaft end and the drive belt may be disposed above the top side of the chassis.

The robotic platform may also include a steer assembly disposed on the chassis, and for each fore and aft wheel assembly, a steer shaft extending longitudinally along the steering axis from a first steer shaft end to a second steer shaft end. The steer assembly may include a steer motor and a steer belt that is controlled by the steer motor. The first steer shaft end may be connected to the wheel axle and the second steer shaft end may be wrapped by the steer belt such that the steer assembly controls rotation of the steer shaft about the steering axis, which thereby steers the wheel about the steering axis. The steer belt may be wrapped around the steer shafts of the fore and aft wheel assemblies such that all the steer shafts rotate synchronously. The drive shaft may be concentrically arranged inside of the steer shaft.

The robotic platform may also include a brake disposed on the second end of each drive shaft and configured to retard motion of the drive shaft to thereby retard motion of the wheel. In one example, the brake may represent a disc brake that includes a disc and a pair of pads. The disc may be arranged on the second drive shaft end and configured to rotate about the steering axis along with the drive shaft. The pads may be arranged on the top and bottom sides of the disc. In addition, the pads may be compressible against the top and bottom sides of the disc in order to retard rotation of the disc and thereby retard rotation of the drive shaft.

In some embodiments, the wheel may be configured to freely rotate 360 degrees about the steering axis. In addition, the bevel gear may include a miter gear. In some embodiments, the robotic platform may include a controller for controlling the drive motor and and disc brakes.

In some embodiments, the robotic platform may be configured to roll along a surface. The bevel gear may be configured such that each caster wheel is tilted relative to the steering axis such that the wheel is steerable about the steering axis at a single point of rotation. In some embodiments, the wheel may include a propeller wheel for converting rotational movement into thrust.

A robotic platform including a drive assembly and steering assembly is also disclosed. In some examples, this robotic platform may include a chassis, a drive assembly, a steer assembly, at least one fore wheel assembly disposed on the fore end of the chassis, and at least one aft wheel assembly disposed on the aft end of the chassis. The drive assembly may include a drive motor and a drive belt that is controlled by the drive motor. The steer assembly may include a steer motor and a steer belt that is controlled by the steer motor. Each of the fore and aft wheel assemblies may include a caster wheel, a drive shaft, a bevel gear, and a steer shaft. The caster wheels may each be mounted to an axle for rotation about a drive axis and steering about a substantially vertical steering axis. The drive shaft may extend along the steering axis from a first drive shaft end to a second drive shaft end. The first drive shaft end may be connected to the wheel axle and the second drive shaft end may be wrapped by the drive belt such that the drive heft controls rotation of the drive shaft about the steering axis to drive the robotic platform in a substantially horizontal direction. The bevel gear may connect the first drive shaft end to the axle such that rotation of the drive shaft about the steering axis controls rotation of the wheel about the drive axis. The steer shaft may extend along the steering axis from a first steer shaft end to a second steer shaft end. The first steer shaft end may be connected to the wheel axle and the second steer shaft end may be wrapped by the steer belt such that the steer belt controls rotation of the steer shaft about the steering axis, which may thereby steer the wheel about the vertical axis.

A method of assembling a robotic platform is also disclosed. In one example, this method may include assembling a pair of fore wheel assemblies and a pair of aft wheel assemblies, mounting each fore wheel assembly to a fore end of the chassis, and mounting each aft wheel assembly to an aft end of the chassis. The method may also include arranging a drive assembly on a chassis, and the drive assembly may include a drive motor and a drive belt that is controlled by the drive motor. Mounting each wheel assembly may include mounting a caster wheel to a respective axle for rotation about a drive axis and steering about a substantially vertical steering axis, and connecting a drive shaft to the axle with a bevel gear, where each drive shaft may extend from a first drive shaft end to a second drive shaft end. The method may also include wrapping the drive belt around each drive shaft such that the drive belt controls rotation of the drive shaft about the steering axis. The bevel gears may each connect the respective first drive shaft ends to the axles, such that rotation of the drive shaft about the steering axis controls rotation of the wheel about the drive axis to drive the robotic platform in a substantially horizontal direction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
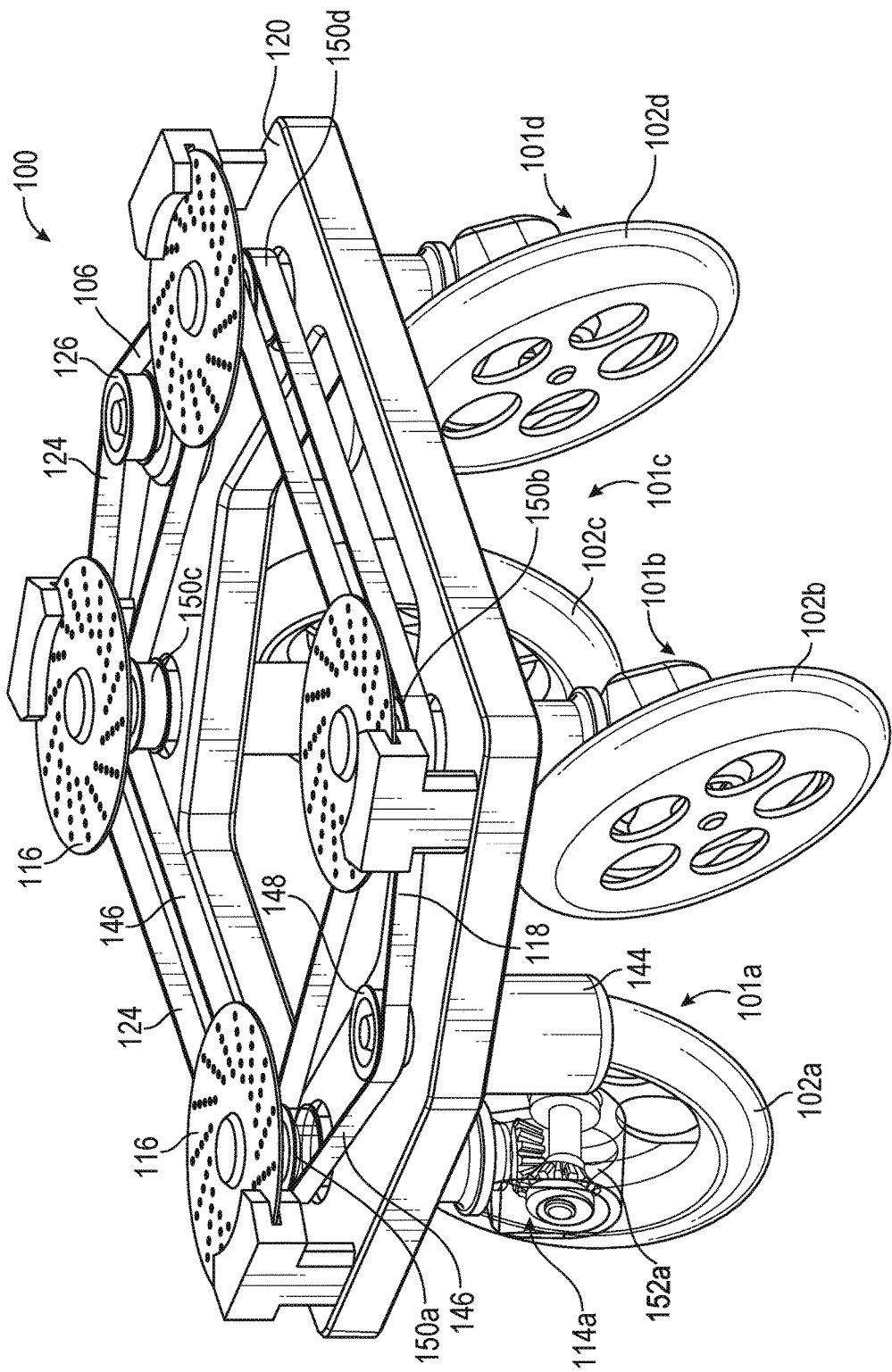
FIG. 1 is a front, right perspective view of a robotic platform, according to an embodiment, with the casting of the left fore wheel assembly shown as being transparent.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to robotic platforms that are driven by caster wheel assemblies. As will be explained in greater detail below, embodiments of the instant disclosure may include a robotic platform having driven (or powered) caster wheels mounted on fore and aft ends of a chassis. The caster wheels may be driven by a power assembly via a drive shaft and bevel gear arrangement. The power assembly may drive rotation of each wheel about an axle to move the platform in a substantially horizontal direction, while the wheel may be steerable about a drive shaft that extends along a substantially vertical steering axis. The power assembly may be connected to one end of the drive shaft to control its rotation about the steering axis. The other end of the drive shaft may be connected to the wheel axle via a bevel gear. The power assembly may include a drive motor and a drive belt that wraps around the circumference of each drive shaft. The drive belt may thus control rotation of the drive shafts synchronously. The drive shafts may each extend from the respective axle to a location above the chassis where it is wrapped by the drive belt.

Thus, the entire power assembly may be located distally from the wheel. As such, because the power assembly may be disposed distally from the wheel, components of the power assembly may be protected, for example, from environmental conditions that may surround the wheel. This may be particularly advantageous for robotic platforms intended to move through extreme weather conditions or through water. Also, a power assembly that is distally located from the wheel may be better protected from damaging, forceful impacts that may occur, for instance, in configurations where the driven caster wheels are mounted to a robot that is susceptible to falling or being dropped. In addition, the driven caster wheel configurations disclosed herein may allow wheels to freely rotate 360 degrees about steering axes without becoming entangled by electrical wires or other components of the drive assembly. This driven caster may also have a brake assembly that is disposed distally from the wheel (e.g., entirely above the chassis), which may similarly protect the brake assembly from impact and environmental damage.

The following will provide, with reference to FIGS. 1-5, detailed descriptions of a robotic platform. FIG. 1 is a front, right perspective view of a robotic platform 100, according to an embodiment, with the casting 152a of the left fore wheel assembly 101a shown as being transparent. The robotic platform 100 may include a chassis 120, a drive assembly 106 arranged on the chassis 120, a pair of fore wheel assemblies 101a, 101b disposed on the fore end of the chassis 120, and a pair of aft wheel assemblies 101c, 101d disposed on the aft end of the chassis 120. The chassis 120 may have oppositely disposed top and bottom sides, and the drive assembly 106 may include a drive motor 122 and a drive belt 124 that is controlled by the drive motor 122.

As noted, the chassis 120 may have oppositely disposed top and bottom sides, a fore end and an aft end. The terms "fore" and "aft," in some embodiments, generally refer to relative positions on a robotic platform and are not necessarily indicative of a primary direction of movement of the robotic platform or of a configuration of a robot mounted on the robotic platform (e.g. the front of robot on the platform may be positioned facing the fore end the aft end, the right or left sides, etc.). Furthermore, the chassis 120 may have a variety of shapes, sizes, thicknesses, etc. in different embodiments of the instant disclosure.

While FIGS. 1-6 show and describe a robotic platform with four caster wheel assemblies 101a-101d, any suitable number of caster wheel assemblies 101a-101d may be provided while remaining within the scope of this disclosure. Furthermore, while the following description at times refers to only one of the wheel assemblies (i.e., the fore, left wheel assembly 101a), it should be well understood that the description of wheel assembly 101a may also apply to some or all of the other wheel assemblies 101b, 101c, and 101d. Finally, a more detailed description and discussion of the driven wheel assemblies described herein may be found in U.S. patent application Ser. No. 15/828,349, titled "DRIVEN CASTER WHEEL AND ASSEMBLY," filed on 30 Nov. 2017, the entirety of which is incorporated herein by reference.

Figure 2:
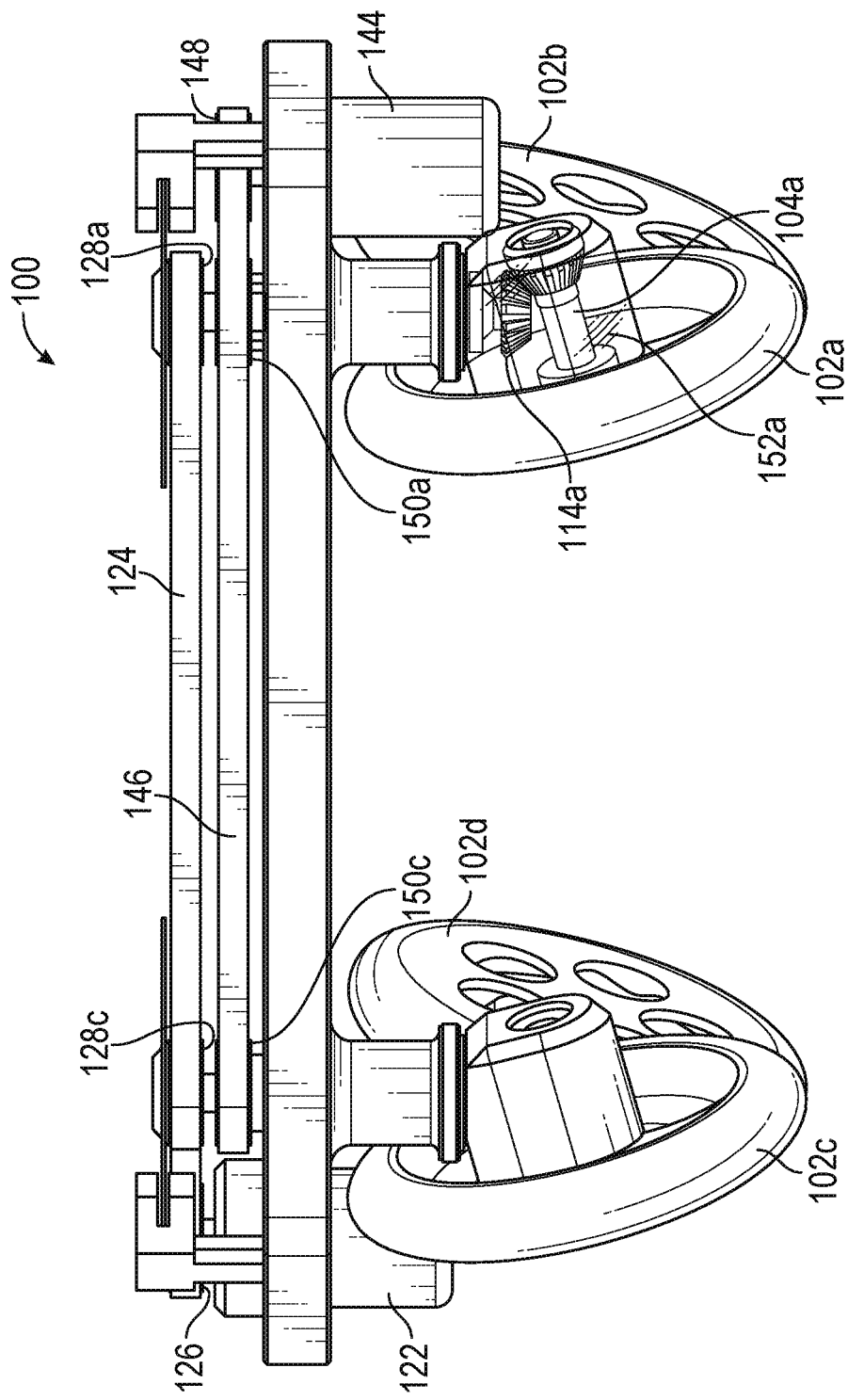
FIG. 2 is a left side view of the robotic platform of FIG. 1.
Figure 5:
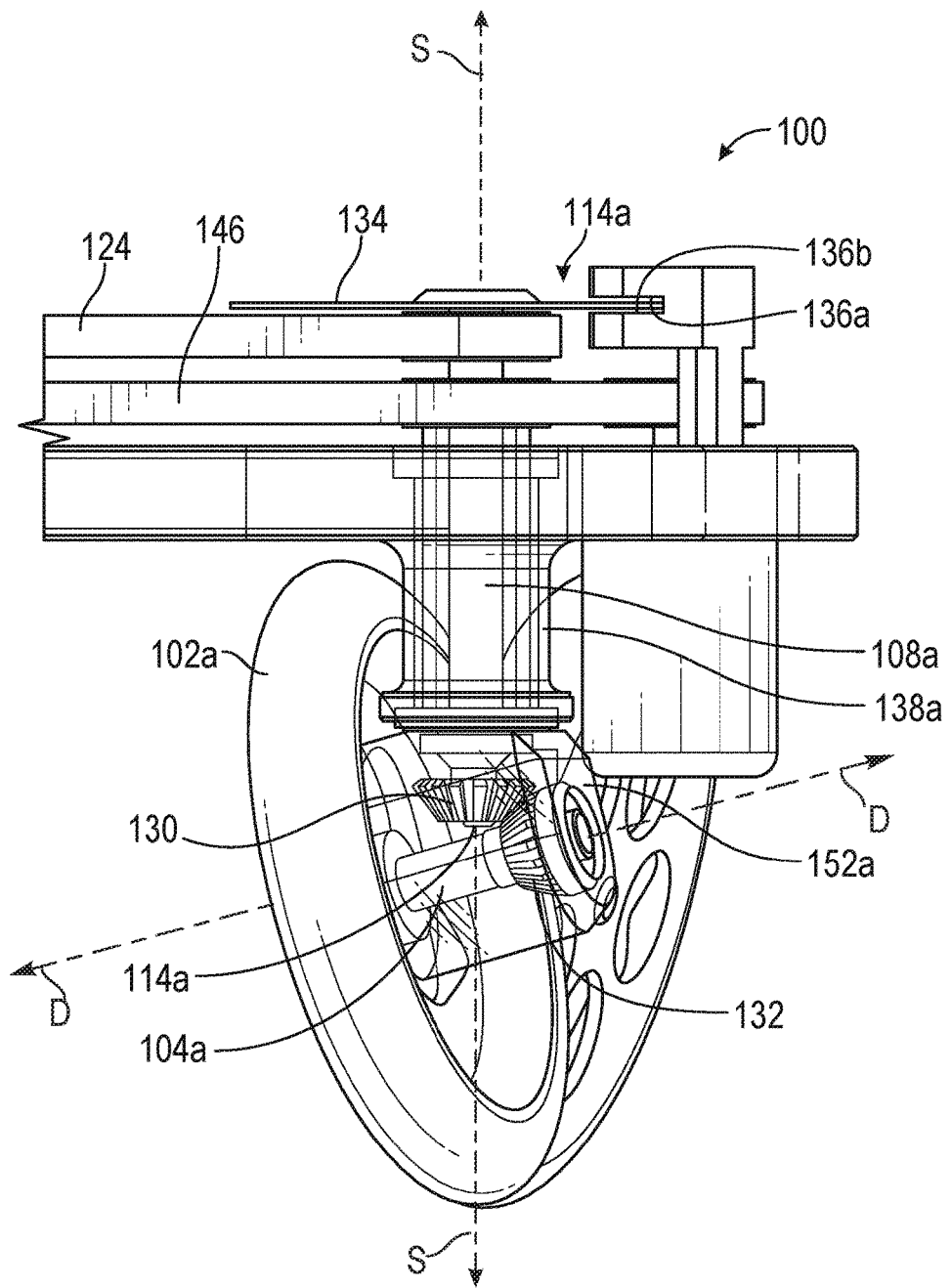
FIG. 5 is another view of a left side view of the robotic platform of FIG. 1.

With reference to FIGS. 2 and 5, the wheel assembly 101a may include a caster wheel 102a mounted to an axle 104a, a drive shaft 108a, and a bevel gear 114a. The wheel 102a may be mounted to its respective axle 104a for rotation about a drive axis D. In this example, the rotation of the wheel 102a about the drive axis may be controlled by a drive assembly 106 that is located distally from the wheel 102a and on the chassis 120. The drive shaft 108a may extend substantially vertically from the drive assembly 106 to the axle 104a and rotate about a substantially vertically steering axis S. The bevel gear 114a may connect the drive shaft 108a to the axle 104a to translate torque and power from the drive assembly 106 to the wheel 102a. As shown in FIG. 1, the entire drive assembly 106 may be located distally from the wheel 102a, which may protect the robotic platform from damage. For example, by positioning the power assembly's electrical components distally from the wheel the robotic platform 100 may be able to drive through deep water or survive other environmental conditions.

As noted, drive assembly 106 may include the drive motor 122. In some embodiments, the drive motor 122 generally represents any type or form of machine powered in any suitable manner (e.g., by electricity, internal combustion, etc.) to supply motive power for the robotic platform 100. Also, the drive belt 124 may generally represent any type or form of transmission mechanism (e.g., a belt, a chain, a driveshaft, etc.) for transferring power from a motor to a wheel assembly.

Figure 3:
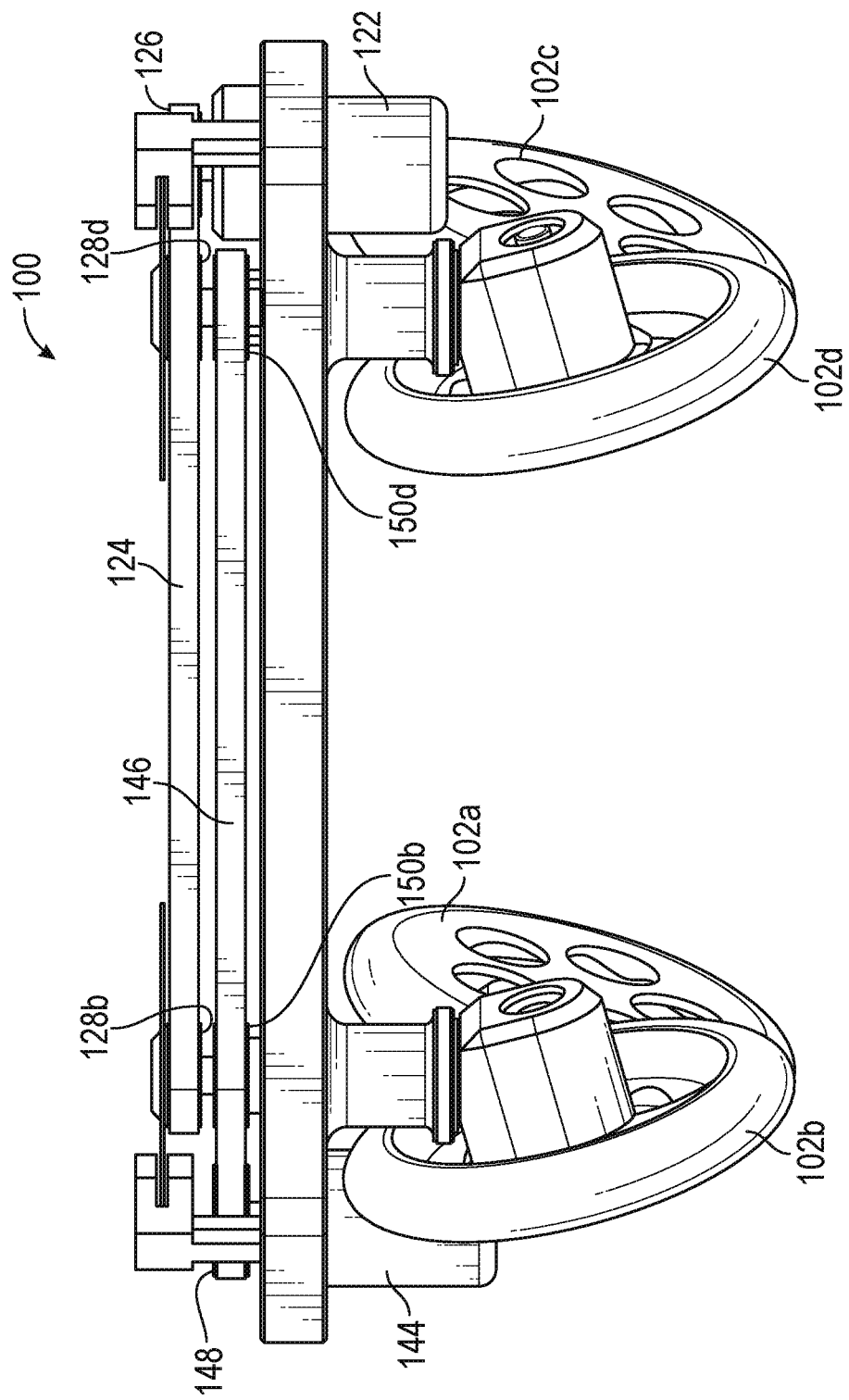
FIG. 3 is a right side view of the robotic platform of FIG. 1.
Figure 4:
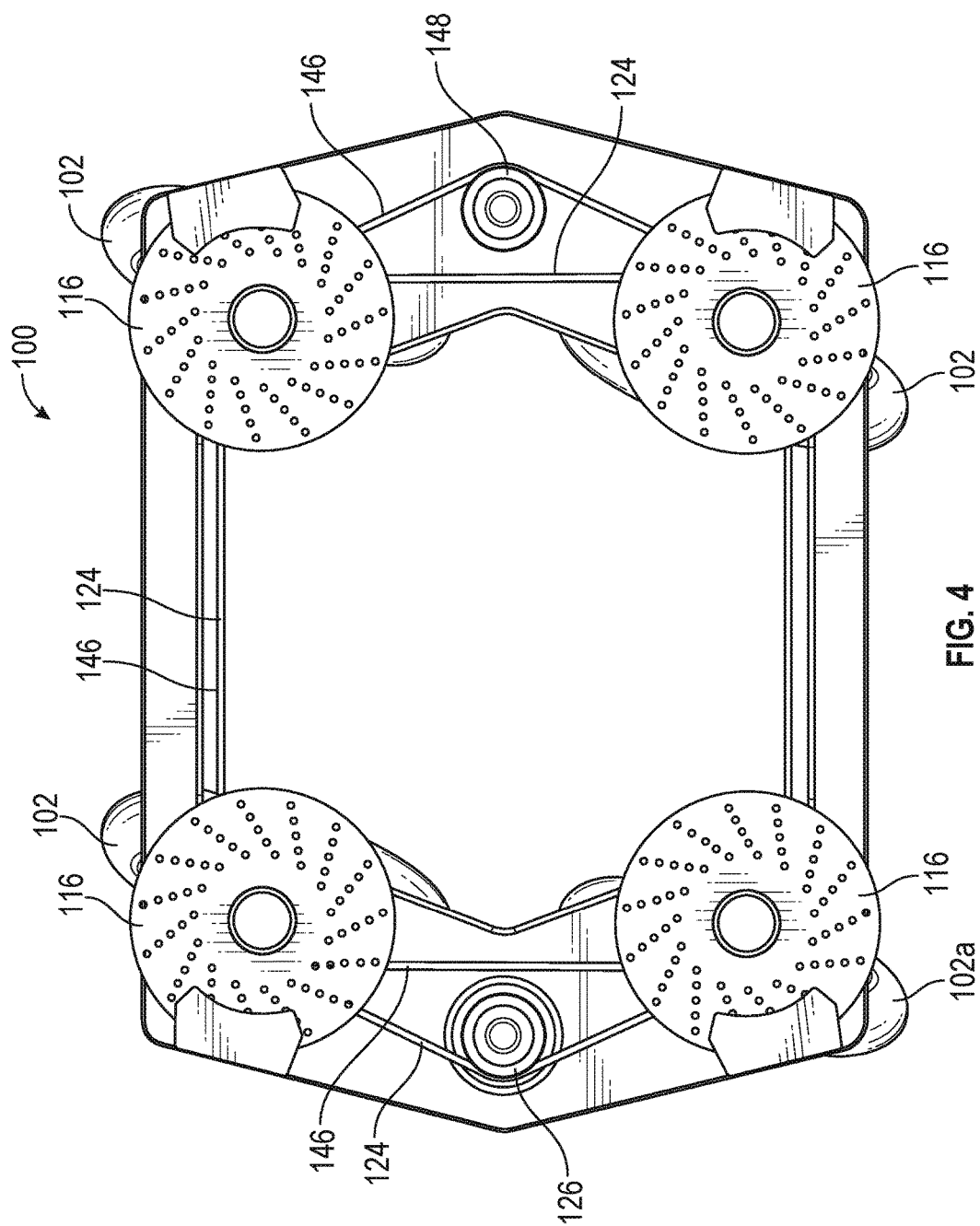
FIG. 4 is a top view of the robotic platform of FIG. 1.

The power of the wheel assemblies 101a-101d may be controlled by drive shaft pulleys 128a-128d that are mounted to or integral with their respective drive shafts. With reference to FIGS. 2 and 3, in some embodiments, the drive motor 122 may rotate about a substantially vertical drive motor axis that extends substantially parallel to the steering axis S. Drive motor pulley 126 may be mounted to the upper portion of the drive motor 122, and the drive shaft pulleys 128a-128d may be mounted to an upper portion of each of their respective drive shafts. The drive belt 124 may extend between the pulleys 126, 128a-128d and within a plane substantially perpendicular to the drive motor axis and steering axis. Thus, the drive motor 122 may cause the drive motor pulley 126 to move about the drive motor axis, which may in turn cause the drive belt 124 to move about the drive pulleys 126, 128a-128d, thereby causing the pulleys 128a-128d and their respective drive shafts to rotate about their respective steering axes. As shown in FIGS. 1 and 4, the drive belt 124 may cause the drive shaft pulleys 128a-128d to all rotate synchronously with one another to thereby cause the drive shafts 108a-108d and the wheels 102a-102d to all rotate synchronously with one another. This may enable the powering of all caster wheel assemblies 101a-101d with improved efficiency.

Referring to FIGS. 1, 2, and 5, the torque and power from the drive motor 122 may be transferred from each drive shaft (e.g., drive shaft 108a) to the respective axle (e.g., axle 104a) via a bevel gear (e.g., bevel gear 114a). The drive shaft 108a and the axle 104a may function as the shafts of the bevel gear 114a. Mating gears 130, 132 may be disposed on the lower portion of the drive shaft 108a and the axle 104a. Thus, the bevel gear 114a may transfer and change the direction of the power and torque from the drive shaft 108a to the wheel 102a. In the embodiments shown in FIGS. 1-5, the bevel gear 114a may be a miter gear, and the crating gears 130, 132 provide a gear ratio of 1:1. The bevel gear, however, can have other suitable configurations and gear ratios while remaining within the scope of this disclosure. For example, the mating gears 130, 132 may include any suitable number of teeth. Also, the intersection of the drive and steering axes can form any suitable angle while remaining within the scope of this disclosure.

As described herein, drive power may be provided to the wheel 102a by way of the substantially vertical drive shaft 108a that extends along one side of the caster wheel 102a from the axle 104a to a location entirely above the wheel (e.g., above chassis 120). As such, the wheel 102a may be able to freely rotate 360 degrees about the steering axis S. This configuration may offer many advantages from a steering and maneuverability standpoint. In addition, the configuration of the drive shaft 108a and the bevel gear 114a may result in the robotic platform 100 that may be free of wires or other electrical components extending close to the wheels 102a-102d. For example, since the drive shaft 108a receives power at its upper end, and transfers power to the wheel 102a at its lower end via the bevel gear 114a, the drive belt 124 may be located entirely above the wheel, and the electrical components may be disposed distally from the wheel 102a, leaving a simple gearing configuration proximate the wheel 102a.

In some embodiments, a brake 116 may be disposed entirely above the wheel 102a. The brake 116 may be disposed on the upper drive shaft end and configured to retard motion of the drive shaft 108a about the steering axis, thereby retarding motion of the wheel 102a about the drive axis. Any suitable brake configuration may be used. In one example, the brake 116 may represent a disc brake, including a disc 134 arranged on the upper drive shaft end and configured to rotate about the steering axis along with the drive shaft 108a. As shown in FIGS. 2-5, the disc 134 may be mounted to the upper drive shaft end by being mounted to the drive shaft pulley 128a. The disc 134 may have top and bottom surfaces, with each extending in a horizontal plane that is substantially perpendicular to the steering axis. A retarding mechanism may be provided to retard motion of the disc 134. Any suitable type of retarding mechanism may be provided. In the embodiments herein described, the retarding mechanism may include top and bottom pads 136a, 136b disposed proximate the top and bottom surfaces of the disc 134, respectively. At least one of the pads 136a, 136b may be compressible towards the disc 134 such that the pads 136a, 136b pinch the disc 134 to thereby retard its motion about the steering axis.

In the embodiment shown and herein described, a steer assembly 118 may be provided to control the steering of the wheels 102a-102d about the steering axis. For each of the wheel assemblies 101a-101d, steer shafts 138a-138d may extend along the steering axis from a bottom steer shaft end to a top steer shaft end. The bottom steer shaft end may be connected to the axle 104a, and the top steer shaft end may be connected to the steer assembly 118, such that the steer assembly 118 controls rotation of the steer shaft 138a about the steering axis, which in turn steers the wheel 102a about the steering axis. The bottom steer shaft end may be mounted to the axle 104a such that the axle 104a rotates about the steering axis along with the steer shaft 138a, thus causing the wheel 102a to rotate about the steering axis. As described in further detail below, the wheel 102a may be tilted with respect to the steering axis.

In one example the steer assembly 118 may include a steer motor 144, a steer belt 146, a steer motor pulley 148, and steer shaft pulleys 150a-150d, the operation of which may be similar to that of the drive assembly 106. The steer motor 144 may extend substantially vertically. The steer motor 144 and drive motor 122 may be disposed on opposite ends or side of the chassis 120 from one another (e.g., on fore and aft ends, on left and right sides). In the embodiment shown in FIGS. 1-5, the drive motor 122 may be disposed on the aft end of the chassis 120 and the steer motor 144 on the fore end of the chassis 120. The steer belt 146 and the steer pulleys 148, 150a-150b may rotate within a plane that is substantially parallel to and below the plane in which the drive motor 122, drive belt 124, and drive pulleys 126, 128a-128d rotate. The steer shaft pulley 150a that is arranged on the steer shaft 138a may be disposed beneath the drive shaft pulley 128a that arranged on the drive shaft 108a.

With reference to FIG. 5, in some embodiments, the steer shaft 138a may be arranged concentrically with respect to the drive shaft 108a. More particularly, the steer shaft 138a and drive shaft 108a may each extend along the steering axis, with the drive shaft 108a being disposed within the steer shaft 138a. As such, and as shown in FIGS. 2 and 5, the drive shaft 108a may be connected to the axle 104a via the bevel gear 114a, and the steer shaft 138a may be mounted to the axle 104a via a casting 152a that is disposed around the bevel gear 114a.

As shown in FIG. 5, in some embodiments, the bevel gear 114a may be configured so that the wheel 102a is tilted with respect to the steering axis. This tilt may reduce scrubbing action when the wheel turns and thus improve durability and steering capabilities. As shown in FIG. 5, a wheel axis may extend along the length of the wheel, perpendicular to the drive axis. In this example, the wheel axis may not extend parallel to the steering axis, but rather may be tilted at an angle relative thereto. As such, while the drive shaft and steering axis extend in a substantially vertical direction, the axle and drive axis may extend in a direction that is not horizontal. In other words, the bevel gear 114a may be configured such that the steering axis and drive axis form an angle that is oblique. In some examples, the wheel 102a may be tilted at an angle so that when the robotic platform 100 is on a surface, the wheel rotates about the steering axis at a point that is its center of mass. For example, for a wheel and tire configuration having a diameter substantially equal to 16 inches, the bevel gear may be configured so that the angle between the drive axis and steering axis may be about 110 degrees and the angle between the steering axis and the wheel may be equal to about 20 degrees.

As shown in FIGS. 1-5, the entire chassis 120 may be arranged above the wheels 102a-102d, and the drive and steer shafts 108a-108d, 138a-138d may extend from the respective axle 104a-104d, through the surface of the chassis 120, to a location at or above a top surface of the chassis 120. In addition, the drive and steer belts 124, 146 and the pulleys 126, 128a-128d, 148, 150a-150d may be located at or above the top surface of the chassis 120. Also, the drive and steer motors 122, 144 may be located distally from the wheels 102a-102d. Thus, with the chassis disposed between the wheel and the drive and steer belts and pulleys, and the drive and steer motors 122, 144 located distally from the wheels 102a-102d, the drive and steer assemblies may be protected from environmental conditions that may surround the wheel.

While FIGS. 1-5 shows one drive motor 122, one drive belt 124, one drive motor pulley 126, and four drive shaft pulleys 128a-128d, the robotic platform 100 may include other suitable numbers of motors, drive belts, and pulleys. Also, in some embodiments, drive belt 124 may be wrapped directly to the circumference of at least one of the drive motor 122 or drive shaft 108a without a separate pulley component (e.g., the bottom portion of the drive motor 122 and/or op portion of the drive shaft 108a may function as a pulley).

The term "caster wheel," in some examples, generally refers to any suitable type of wheel, disc, or other object that is rotatable about an axis. Examples of wheels include, without limitation, a disc-shaped object that is configured to roll along a surface, a propeller capable of converting rotational movement to thrust (e.g., to drive a boat through the water), or any other type or form of rotatable object. The robotic platform described herein can have a multitude of applications. For example, the robotic platform may support a robot that that is configured to navigate through extreme environmental conditions, perform surgery in a hospital, manage a data center, etc.

While wheel assemblies 101a, 101b are referred to herein as the fore wheel assemblies, and wheel assemblies 101c, laid are referred to herein as the aft wheel assemblies, the disclosed platform 100 may move in multiple directions such that the aft end, right side, and left side may also be located at the front of the platform 100. For example, the disclosed robotic platform may be capable of moving in all directions on a substantially horizontal surface. In one instance, the wheels 102a-102d may turn about the steering axis 90 degrees, such that the right side of the platform 100 becomes the front of the vehicle as it moves horizontally across the surface. This may be particularly advantageous when navigating the robotic platform 100 between objects or barriers. For example, in order to "parallel park" the robotic platform 100 into a space between two objects, the platform does not need to maneuver and angle forward and backward, as is often the case in traditional parallel parking. Rather, the robotic platform 100 position itself beside and parallel to a parking space, have the wheels 102a-102d turned so that they are directed to the space (e.g., have the wheels 102a-102d turned 90 degrees), and then simply move linearly (e.g., in a sideways direction) into the space. Also, the robotic platform 100 may move in a backward direction without using a reverse gear. Thus, the platform 100 may be capable of moving in the backward direction with as much speed as it is capable of moving in the forward direction.

Figure 6:
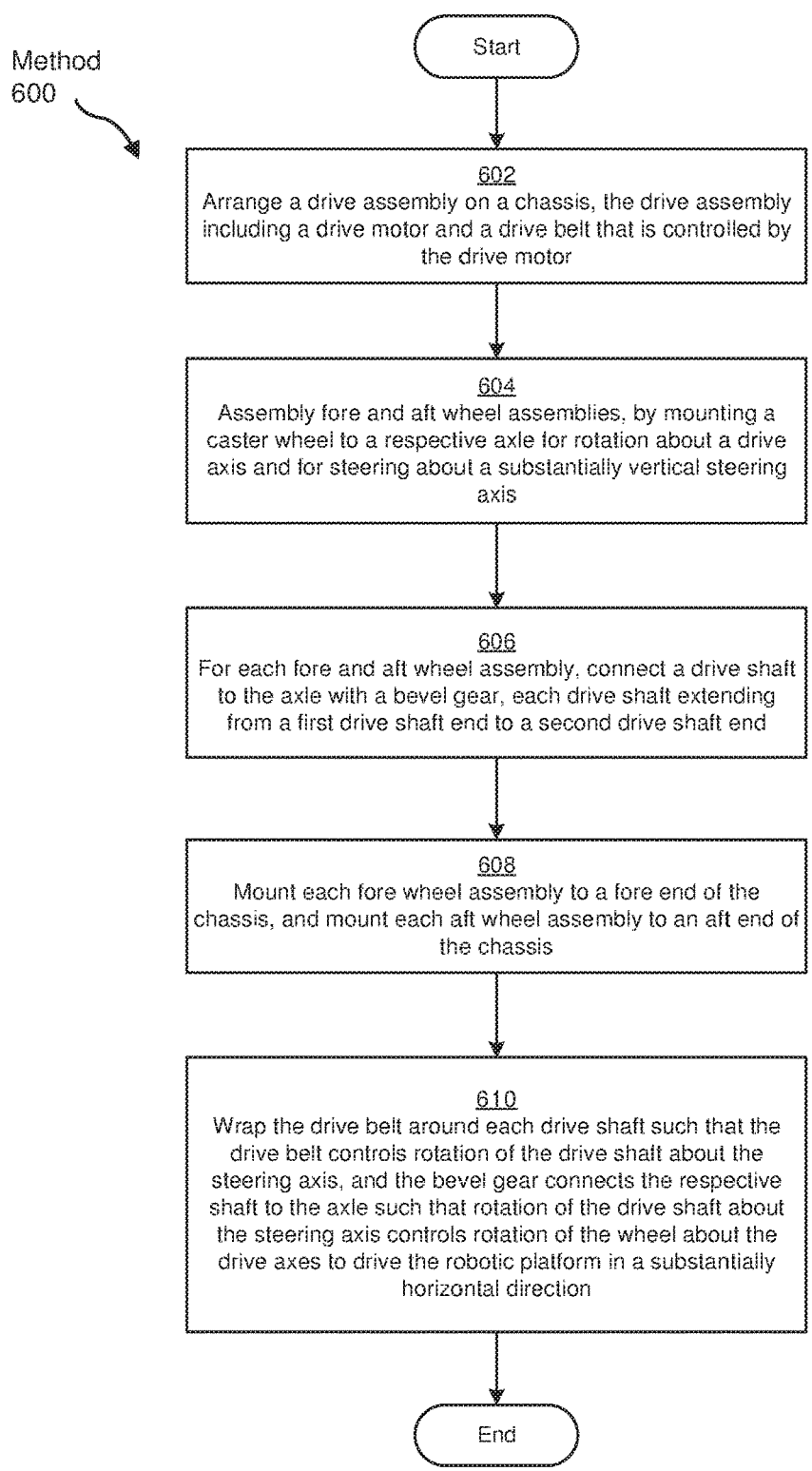
FIG. 6 is a flowchart of a method for assembling a robotic platform, according to an embodiment.

Referring now to FIG. 6, also disclosed herein is a method 600 of assembling a robotic platform, such as the robotic platform 100 described above with reference to FIGS. 1-5. In step 602, a drive assembly may be arranged on a chassis. The drive assembly may include a drive motor and a drive belt that is controlled by the motor. In steps 604 and 606, a pair of fore wheel assemblies and a pair of aft wheel assemblies may be assembled. In step 604, for each wheel assembly, a caster wheel may be mounted to a respective axle for rotation about a drive axis and steering about a substantially vertical steering axis. In step 606, for each wheel assembly, a drive shaft may be connected to the axle with a bevel gear, such that each drive shaft extends from a first drive shaft end to a second drive shaft end. In step 608, each fore wheel assembly may be mounted to a fore end of the chassis, and each aft wheel assembly may be mounted to an aft end of the chassis. In step 610, the drive belt may be wrapped around each drive shaft such that the drive belt controls rotation of the drive shaft about the steering axis. The bevel gear may connect the respective shaft to the axle such that rotation of the drive shaft about the steering axis controls rotation of the wheels about the drive axes to drive the robotic platform in a substantially horizontal direction.

In some examples, in assembling each of the fore and aft wheel assemblies, the method may further include connecting a first end of a steer shaft to the axle, with each steer shaft extending along the steering axis from a first steer shaft end to a second steer shaft end. The method may also include arranging a steering assembly on the chassis, and the steering assembly may include a steer motor and a steer belt that is controlled by the steer motor. The method may also include wrapping the steer belt around each steer shaft such that the steer assembly controls rotation of the steer shaft about the steering axis, which thereby steers the wheel about the steering axis.

The platform 100 may be used in a variety of contexts and/or may be used to support a variety of different types of robots. For example, platform 100 may support an autonomous or semi-autonomous data center robot. In this example, platform 100 may enable the data center robot to move through aisles of a data center to install, remove, and/or service rack mount units and modules within the data center. Additionally or alternatively, multiple instances of platform 100 may support a robotic gantry capable of moving among data center aisle and servicing modules within the aisles at various different heights.

As another example, platform 100 may support a telepresence robot. In this example, platform 100 may enable to telepresence robot to move from one location to another, to move to the optimal location for interacting with another robot or human, and/or to move in any other suitable manner.

Figure 7:
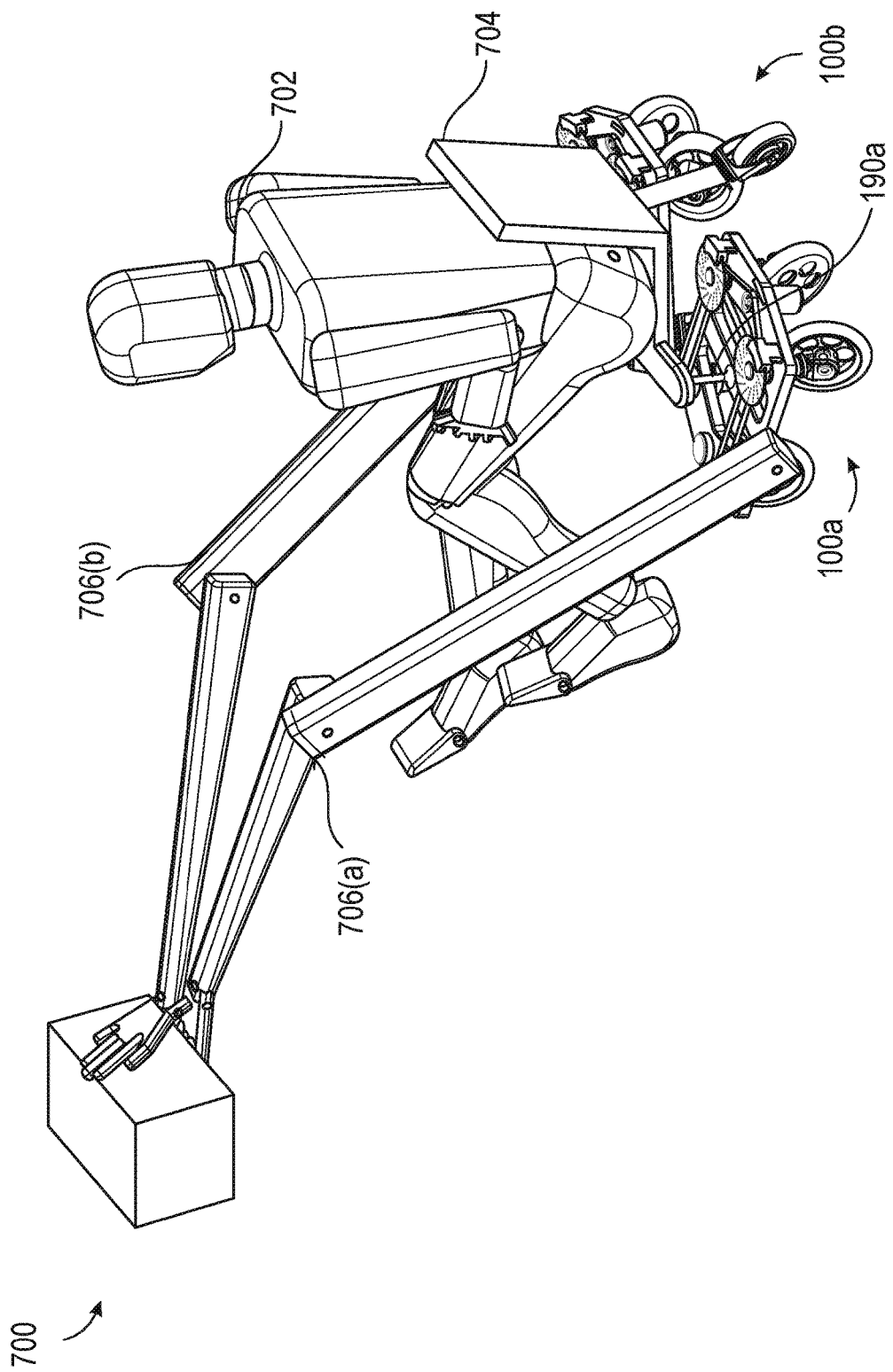
FIG. 7 is a perspective view of two of the robotic platforms from FIG. 1 being used to support an accessibility robot.

A third example is provided in FIG. 7, which shows an accessibility robot 700 mounted on two instances of platform 100, shown as platform 100a and platform 100b. In this example, a chair 704 may be coupled to platform 100a at ball joint 190a and platform 100b at a ball joint (not visible in FIG. 7) on platform 100b. Accessibility robot 700 may also include arms 706(a) and 706(b) coupled to platforms 100a and 100b, respectively. A user 702 may control arms 706(a) and 706(b) via any suitable control interface (e.g., using voice control, using a joystick or control pad, etc.) to perform a variety of tasks. Similarly, the user 702 may use a control interface to direct platforms 100a and 100b to move accessibility robot 700 from one location to another.

While several distinct examples of using platform 100 have been presented, platform 100 may be utilized in any other suitable context and/or to support any other suitable type or form of robot.

The disclosed robotic platform may provide many advantages. For example, the robotic platform's power assembly may be located entirely outside the circumference of the wheel, thus protecting the power assembly from forceful impacts as well as environmental conditions that may surround the robotic platform. Similar benefits may be achieved by disposing a brake assembly distally from the wheel. The robotic platform disclosed herein may also allow the wheel to freely rotate 360 degrees about its steering axis without becoming entangled by electrical wires or other components of the drive assembly. The disclosed robotic platform may have a plurality of wheels that are powered by a single drive motor and drive belt, thus providing improved power efficiency.

The methods and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure. Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A robotic platform, comprising:
 a chassis having oppositely disposed top and bottom sides, a fore end and an aft end;
 a drive assembly arranged on the chassis, the drive assembly comprising a drive motor and a drive belt that is controlled by the drive motor; and
 a pair of fore wheel assemblies disposed on the fore end of the chassis and a pair of aft wheel assemblies disposed on the aft end of the chassis, each of the fore and aft wheel assemblies comprising:

a caster wheel mounted to an axle for rotation about a drive axis and steering about a substantially vertical steering axis, and
a drive shaft extending along the steering axis from a first drive shaft end to a second drive shaft end, the first drive shaft end being connected to the axle and the second drive shaft end being wrapped by the drive belt such that the drive belt controls rotation of the drive shaft about the steering axis.

2. The robotic platform of claim 1, wherein the drive belt is wrapped around the drive shafts of the fore and aft wheel assemblies such that the drive shafts of each of the fore and aft wheel assemblies rotate synchronously.

3. The robotic platform of claim 1, wherein the drive axis and the steering axis together form an oblique angle such that the caster wheel is tilted relative to the drive shaft.

4. The robotic platform of claim 1, wherein the second drive shaft end and the drive belt are disposed at the top side of the chassis.

5. The robotic platform of claim 1, further comprising:
a steer assembly disposed on the chassis, the steer assembly comprising a steer motor and a steer belt that is controlled by the steer motor; and
for each fore and aft wheel assembly, a steer shaft extending longitudinally along the steering axis from a first steer shaft end to a second steer shaft end, the first steer shaft end being connected to the axle and the second steer shaft end being wrapped by the steer belt such that the steer assembly controls rotation of the steer shaft about the steering axis, which thereby steers the caster wheel about the steering axis.

6. The robotic platform of claim 5, wherein the steer belt is wrapped around the steer shafts of the fore and aft wheel assemblies such that the steer shafts of each of the fore and aft wheel assemblies rotate synchronously.

7. The robotic platform of claim 5, wherein the drive shaft is concentrically arranged inside of the steer shaft.

8. The robotic platform of claim 1, further comprising a brake arranged on the second drive shaft end and configured to retard motion of the drive shaft to thereby retard motion of the caster wheel.

9. The robotic platform of claim 8, wherein the brake comprises a disc brake, the disc brake comprising:
a disc arranged on the drive shaft and configured to rotate with the drive shaft about the steering axis, and
a pair of pads on top and bottom sides of the disc, wherein the pads are compressible against the disc to retard rotation of the disc, and thereby retard rotation of the drive shaft.

10. The robotic platform of claim 9, further comprising a controller for controlling the drive motor and the disc brake.

11. The robotic platform of claim 1, wherein at least one of the fore and aft wheel assemblies comprises a bevel gear connecting the first drive shaft end to the axle.

12. The robotic platform of claim 11, wherein the bevel gear is configured such that the caster wheel is tilted relative to the steering axis and the caster wheel is steerable about the steering axis at a single point of rotation.

13. The robotic platform of claim 1, wherein the caster wheel is configured to freely rotate 360 degrees about the steering axis.

14. The robotic platform of claim 1, wherein the caster wheel comprises a propeller that converts rotational movement into thrust.

15. The robotic platform of claim 1, further comprising a data-center robot mounted to the robotic platform and configured to service one or more data center modules.

16. A robotic platform, comprising:
a chassis having oppositely disposed top and bottom sides, and a fore end and an aft end;
a drive assembly disposed on the chassis, the drive assembly comprising a drive motor and a drive belt that is controlled by the drive motor;
a steer assembly disposed on the chassis, the steer assembly comprising a steer motor and a steer belt that is controlled by the steer motor; and
at least one fore wheel assembly disposed on the fore end of the chassis and at least one aft wheel assembly disposed on the aft end of the chassis, each of the fore and aft wheel assemblies comprising:
a caster wheel mounted to an axle for rotation about a drive axis and steering about a substantially vertical steering axis,
a drive shaft extending along the steering axis from a first drive shaft end to a second drive shaft end, the first drive shaft end being connected to the axle and the second drive shaft end being wrapped by the drive belt such that the drive belt controls rotation of the drive shaft about the steering axis to drive the robotic platform in a substantially horizontal direction, and
a steer shaft extending along the steering axis from a first steer shaft end to a second steer shaft end, the first steer shaft end being connected to the axle and the second steer shaft end being wrapped by the steer belt such that the steer belt controls rotation of the steer shaft about the steering axis, which thereby steers the caster wheel about the vertical axis.

17. The robotic platform of claim 16, wherein the drive shaft is concentrically arranged inside of the steer shaft.

18. The robotic platform of claim 17, further comprising a brake arranged on the second drive shaft end and configured to retard motion of the drive shaft to thereby retard motion of the caster wheel.

19. A method of assembling a robotic platform, the method comprising:
arranging a drive assembly on a chassis, the drive assembly comprising a drive motor and a drive belt that is controlled by the drive motor;
assembling a pair of fore wheel assemblies and a pair of aft wheel assemblies, wherein assembling each of the fore and aft wheel assemblies comprises:
mounting a caster wheel to a respective axle for rotation about a drive axis and steering about a substantially vertical steering axis, and
connecting a drive shaft to the axle with a bevel gear, the drive shaft extending from a first drive shaft end to a second drive shaft end;
mounting each fore wheel assembly to a fore end of the chassis and each aft wheel assembly to an aft end of the chassis; and
wrapping the drive belt around each drive shaft such that the drive belt controls rotation of the drive shaft about the steering axis.

20. The method of claim 19, wherein:
assembling each of the fore and aft wheel assemblies further comprises connecting a first steer shaft end of a steer shaft to the axle, the steer shaft extending along the steering axis from the first steer shalt end to a second steer shaft end; and
the method further comprises:
arranging a steering assembly on the chassis, the steering assembly comprising a steer motor and a steer belt that is controlled by the steer motor; and wrapping the steer belt around each steer shaft such that the steer assembly controls rotation of the steer shaft about the steering axis, which thereby steers the caster wheel about the steering axis.

\* \* \* \* \*